(12) United States Patent
Ouyang et al.

(10) Patent No.: US 12,461,424 B2
(45) Date of Patent: Nov. 4, 2025

(54) PROGRAMMABLE OPTICAL CHIP AND TERMINAL

(71) Applicant: UNITED MICROELECTRONICS CENTER CO., LTD, Chongqing (CN)

(72) Inventors: Boling Ouyang, Chongqing (CN); Naidi Cui, Chongqing (CN); Junbo Feng, Chongqing (CN); Jin Guo, Chongqing (CN)

(73) Assignee: UNITED MICROELECTRONICS CENTER CO., LTD, Chongqing (CN)

( * ) Notice: Subject to any disclaimer, the term of this patent is extended or adjusted under 35 U.S.C. 154(b) by 225 days.

(21) Appl. No.: 17/924,346

(22) PCT Filed: Jul. 21, 2021

(86) PCT No.: PCT/CN2021/107517
§ 371 (c)(1),
(2) Date: Nov. 9, 2022

(87) PCT Pub. No.: WO2022/166122
PCT Pub. Date: Aug. 11, 2022

(65) Prior Publication Data
US 2023/0185155 A1    Jun. 15, 2023

(30) Foreign Application Priority Data
Feb. 4, 2021   (CN) .................. 202110156450.X

(51) Int. Cl.
*G02B 6/35*   (2006.01)
*G02F 1/31*   (2006.01)
*G02F 1/313*   (2006.01)

(52) U.S. Cl.
CPC ......... *G02F 1/3136* (2013.01); *G02B 6/3546* (2013.01); *G02B 6/3556* (2013.01);
(Continued)

(58) Field of Classification Search
CPC .... G02B 26/06; G02B 6/3546; G02B 6/3556; G02B 6/3598
See application file for complete search history.

(56) References Cited

U.S. PATENT DOCUMENTS

| | | | |
|---|---|---|---|
| 2004/0027644 A1 | 2/2004 | Fazi, Jr. | |
| 2009/0129723 A1* | 5/2009 | Chen | ........... G02F 1/3133 385/14 |

(Continued)

FOREIGN PATENT DOCUMENTS

| | | |
|---|---|---|
| CN | 1512698 A | 7/2004 |
| CN | 102202005 A | 9/2011 |

(Continued)

OTHER PUBLICATIONS

Bogaerts, W. et al. "Programmable Photonic Circuits," Nature, vol. 586, No. 7828, Oct. 2020, 15 pages.
(Continued)

*Primary Examiner* — Charlie Y Peng
(74) *Attorney, Agent, or Firm* — MASCHOFF BRENNAN; Liang Huang

(57) ABSTRACT

A programmable optical chip and a terminal is provided, wherein the optical chip includes: one or more first transmission paths for transmitting an optical signal in the programmable optical chip; first programmable basic devices arranged in an array; and optical IP cores, wherein the optical IP cores and the first programmable basic devices are optically coupled, and the optical IP cores are optically coupled. The optical IP cores include optical soft cores and/or optical firm cores. Each type of optical soft core includes second programmable basic devices and one or more second transmission paths for transmitting the optical signal in the optical soft core. Each type of optical firm core includes third programmable basic devices, one or more third transmission paths for transmitting the optical signal in
(Continued)

the optical firm core, and first optical devices used to process the optical signal. In the solution of the present disclosure, operations such as programming are performed on the optical chip such that the optical chip can implement a plurality of different functions.

20 Claims, 3 Drawing Sheets

(52) U.S. Cl.
CPC ............ *G02B 6/3598* (2013.01); *G02F 1/311* (2021.01); *G02F 1/3137* (2013.01)

(56) References Cited

U.S. PATENT DOCUMENTS

| | | |
|---|---|---|
| 2015/0086203 A1 | 3/2015 | Boduch et al. |
| 2015/0354938 A1 | 12/2015 | Mower et al. |
| 2020/0209473 A1 | 7/2020 | Capmany Francoy et al. |
| 2022/0197012 A1* | 6/2022 | Han .................. G02B 6/26 |

FOREIGN PATENT DOCUMENTS

| | | | | |
|---|---|---|---|---|
| CN | 103246088 A | | 8/2013 | |
| CN | 103261934 A | | 8/2013 | |
| CN | 103576345 A | | 2/2014 | |
| CN | 105122833 A | | 12/2015 | |
| CN | 105763962 A | | 7/2016 | |
| CN | 106936736 A | | 7/2017 | |
| CN | 109477938 A | | 3/2019 | |
| CN | 105763962 B | * | 5/2019 | ......... G02B 6/12004 |
| CN | 111683304 A | | 9/2020 | |
| CN | 112817891 A | | 5/2021 | |
| CN | 119996114 A | * | 5/2025 | |
| EP | 3467556 A1 | * | 4/2019 | ............... G02B 6/35 |
| WO | 2020104716 A1 | | 5/2020 | |

OTHER PUBLICATIONS

Xu, W. "Research on the applications of silicon-based waveguide gratings and microrings in microwave photonic systems," China Academic Journal Electronic Publishing House, May 2019, 137 pages.

* cited by examiner

PROGRAMMABLE OPTICAL CHIP AND TERMINAL

CROSS REFERENCE TO RELATED APPLICATIONS

The present disclosure is a U.S. National Stage application under 35 U.S.C. § 371 of International Application No. PCT/CN2021/107517, filed on Jul. 21, 2021, which claims priority to Chinese patent application No. 202110156450.X, filed on Feb. 4, 2021. The contents of both applications are incorporated herein by reference as a part of the present disclosure in their entireties for all purposes.

TECHNICAL FIELD

Embodiments of the present disclosure relate to the field of integrated photonic chips, and specifically to a programmable optical chip and a terminal.

BACKGROUND

At present, the photonic integration industry is in an initial stage of large-scale integration. As optical chips have been widely applied in fields such as optical communication, optical quantum computing, microwave photonics, etc., the optical chips are required to implement more complex functions. Similar to the development of the integrated circuit industry, in the photonic integration field, there is an urgent need for a programmable optical chip that can promote a rapid development of the photonic integration industry, like a field programmable gate array (FPGA).

The programmable optical chip has a large number of potential applications in fields such as optical communication, photon artificial intelligence, microwave photonics, optical quantum computing, optical sensing, etc.

SUMMARY

Some embodiments of the present disclosure provides a programmable optical chip, the optical chip including: one or more first transmission paths for transmission of optical signals in the programmable optical chip; first programmable basic devices arranged in an array of a first preset shape; and optical IP (Intellectual Property) cores, wherein the optical IP cores and the first programmable basic devices are optically coupled through the first transmission paths, the first programmable basic devices are optically coupled through the first transmission paths, and the optical IP cores are optically coupled through the first transmission paths; wherein the optical IP cores include one or more types of optical soft cores, and/or one or more types of optical firm cores. Each type of optical soft cores includes second programmable basic devices and one or more second transmission paths for transmission of the optical signal in the optical soft core, and each type of optical firm cores includes third programmable basic devices, one or more third transmission paths for transmission of the optical signal in the optical firm core, and first optical devices configured to process the optical signal; wherein the first programmable basic devices are configured to control a path and a phase of the optical signal transmitted in the first transmission paths, the second programmable basic devices are configured to control a path and a phase of the optical signal transmitted in the second transmission paths, and the third programmable basic devices are configured to control a path and a phase of the optical signal transmitted in the third transmission paths.

In some embodiments, the second programmable basic devices are arranged in an array of a second preset shape, and different types of optical soft cores satisfy one or more of the following: the second preset shapes being different, types of the second programmable basic devices being different, sizes of the second programmable basic devices being different, quantities of the second programmable basic devices being different, and overall shapes of the second programmable basic devices being different.

In some embodiments, the optical IP cores further include: one or more types of optical hard cores, the optical hard cores being second optical devices to process the optical signal.

In some embodiments, the optical hard cores include one or more of the following: a power amplifier, a laser, a detector, a modulator, an optical intensity monitor, an attenuator, a filter, a delay line, or a wavelength division multiplexer.

In some embodiments, the optical firm cores include one or more of the following: a programmable delay line, a programmable filter, a programmable modulator, and a programmable wavelength division multiplexer.

In some embodiments, the optical chip satisfies one or more of the following: the first programmable basic device being an optical switch based on a Mach-Zehnder interferometer or a micro-electro-mechanical system device; the second programmable basic device being an optical switch based on a Mach-Zehnder interferometer or a micro-electro-mechanical system device; or the third programmable basic device being an optical switch based on a Mach-Zehnder interferometer or a micro-electro-mechanical system device.

In some embodiments, the optical IP core is located at a periphery of a plurality of first transmission paths or embedded in an interior of the plurality of first transmission paths.

In some embodiments, the optical chip further includes an optical interface configured to input or output the optical signal, the optical interface including an interface based on grating coupling and an interface based on edge coupling.

In some embodiments, the optical chip further includes: an electrical interface configured to input or output an electrical signal.

In some embodiments, the first programmable basic devices are arranged in a hexagonal array.

In some embodiments, upon optical computing by the optical chip, a plurality of second programmable basic devices in each optical soft core is arranged in a grid array or a triangular array.

In some embodiments, the first transmission paths, the second transmission paths, and the third transmission paths are optical waveguides.

Some embodiments of the present disclosure further provides a terminal, the terminal including a programmable optical chip as described above.

The technical solutions of the embodiments of the present disclosure have the following beneficial effects:

In the solutions of the embodiments of the present disclosure, the optical chip includes the optical soft cores and/or the optical firm cores. The second programmable basic devices in the optical soft core may be used to control the path or the phase of the optical signal transmitted in the second transmission paths. The third programmable basic devices in the optical firm core may be used to control the path and the phase of the optical signal in the third transmission paths. Therefore, the transmission paths of the optical signal in the optical soft core and the optical firm core are both controllable. The transmission path of the optical signal in the optical soft core can be controlled by setting the second programmable basic devices, and the transmission path of the optical signal in the optical firm core can be controlled by setting the third programmable basic devices. In addition, the phase of the optical signal can also be set by the second programmable basic devices and/or the third programmable basic devices, so that an interference of the optical signal in the optical soft core and/or the optical firm core can be controlled by controlling the phase of the optical signal. Therefore, the optical soft cores and the optical firm cores in the embodiments of the present disclosure can satisfy different function requirements and performance requirements, which thereby allows the optical chip to implement a plurality of different functions, and enables the manufactured optical chip to have a programmable effect.

Further, in the embodiments of the present disclosure, the second programmable basic devices in the optical soft core are arranged in the array of the second preset shape. In different types of optical soft cores, one or more of the second preset shapes, the types, sizes, quantities, and overall shapes of the second programmable basic devices may be different. By setting the type, the size, the quantity, the shape of the array arrangement, and the overall shape of the second programmable basic devices in an optical soft core, different types of optical soft cores can be set on a same optical chip, to satisfy differentiated requirements of different functions for the optical soft cores. This enables the optical chip to implement richer and more complex functions, and enables the manufactured optical chip to achieve a more complex programming effect.

DETAILED DESCRIPTION OF EMBODIMENTS

Figure 1:
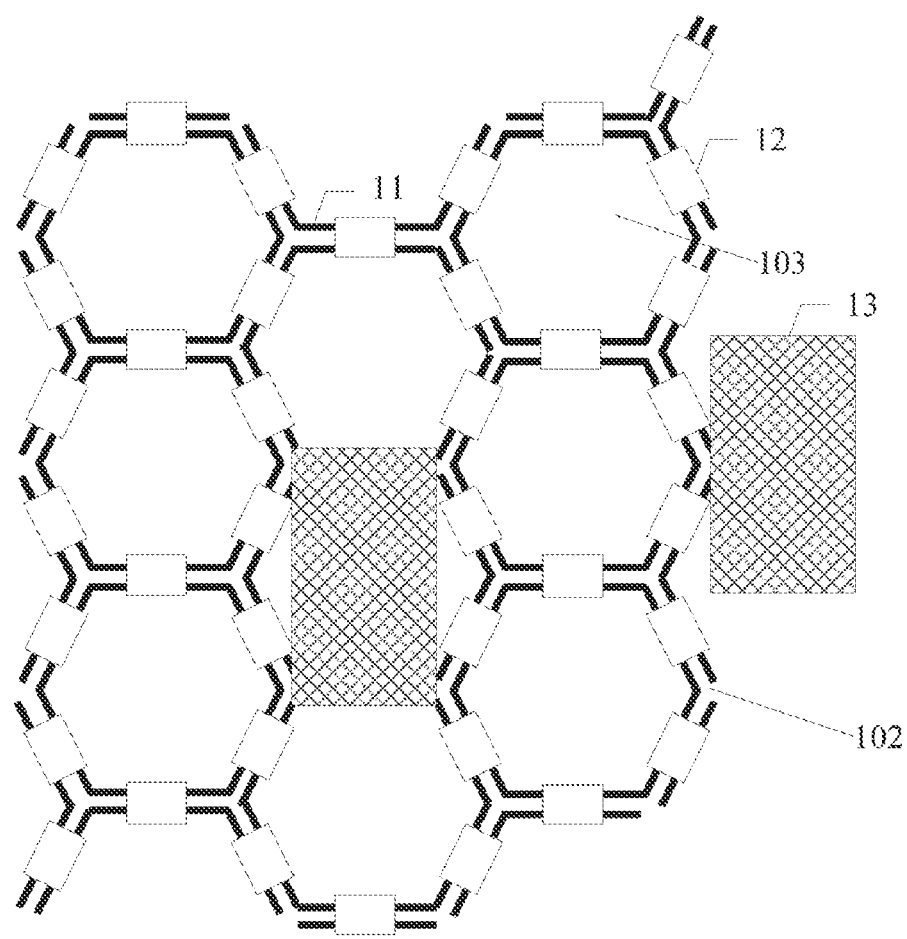
FIG. 1 is a schematic structural diagram of a programmable optical chip according to some embodiments of the present disclosure.

The inventors of the present application recognize that the current mainstream optical chips in the industry are developed and customized according to users' specific requirements. An optical chip for a certain application requirement can be put into use only after design development and production processes, which takes a long cycle for design development and production, thereby causing a relatively low production efficiency and a relatively high production cost. The functions of the optical chips cannot be changed after completion, which results into a low flexibility and a high production cost. Therefore, there is an urgent need for a programmable optical chip. Programming operations are performed on the optical chip such that the optical chip can implement a plurality of different functions, thereby reducing the production cost of the optical chip.

Some embodiments of the present disclosure provides a programmable optical chip, the optical chip including: one or more first transmission paths for transmitting an optical signal in the programmable optical chip; first programmable basic devices arranged in a first preset array; and optical IP cores, it is optically coupled through the first transmission paths between the optical IP cores and the first programmable basic devices, among the first programmable basic devices, and among the optical IP cores; wherein the optical IP cores include one or more types of optical soft cores, and/or one or more types of optical firm cores. Each type of optical soft cores includes second programmable basic devices and one or more second transmission paths for transmitting the optical signal in the optical soft core, and each type of optical firm cores includes third programmable basic devices, one or more third transmission paths for transmitting the optical signal in the optical firm core, and first optical devices configured to process the optical signal. The first programmable basic devices are used to control a path and a phase of the optical signal transmitted in the first transmission paths, the second programmable basic devices are used to control a path and a phase of the optical signal transmitted in the second transmission paths, and the third programmable basic devices are used to control a path and a phase of the optical signal transmitted in the third transmission paths.

In the solution of the embodiments of the present disclosure, the optical chip includes the optical soft cores and/or the optical firm cores. The second programmable basic devices in the optical soft core may be used to control the path or the phase of the optical signal transmitted in the second transmission paths. The third programmable basic devices in the optical firm core may be used to control the path and the phase of the optical signal in the third transmission paths. Therefore, the transmission paths of the optical signal in the optical soft core and the optical firm core are both controllable. The transmission path of the optical signal in the optical soft core can be controlled by setting the second programmable basic devices, and the transmission path of the optical signal in the optical firm core can be controlled by setting the third programmable basic devices. In addition, the phase of the optical signal can also be set by the second programmable basic devices and/or the third programmable basic devices, so that the interference of the optical signal in the optical soft core and/or the optical firm core can be controlled by controlling the phase of the optical signal. Therefore, the optical soft cores and the optical firm cores can satisfy different function requirements and performance requirements, thereby allowing the optical chip to implement a plurality of different functions.

In order to make the above objectives, features and beneficial effects of the present disclosure more obvious and easier to understand, the specific embodiments of the present disclosure are detailed with reference to the accompanying drawings.

Referring to FIG. 1, FIG. 1 is a schematic structural diagram of a programmable optical chip according to some embodiments of the present disclosure.

The optical chip may include: one or more first transmission paths 11 for transmitting an optical signal in the optical chip, first programmable basic devices 12, and optical IP cores 13, where the first optical transmission path 11 may be an optical waveguide.

Further, the first programmable basic device 12 may be used to control a path and/or a phase of the optical signal transmitted in the first transmission path 11.

Further, the first programmable basic device 12 may be further used to control a transmission amount of the optical signal in the first transmission path 11.

Specifically, the first programmable basic device 12 has at least one input interface. The input interface is connected to a first transmission path 11, and the optical signal transmitted in the first transmission path 11 can be input into the first programmable basic device 12 through the input interface. The first programmable basic device 12 has a plurality of output interfaces, each of which is connected to a first transmission path 11. For the optical signal input into the first programmable basic device 12, one or more output interfaces through which the optical signal is output from the first programmable basic device 12 may be set by controlling an electrical signal applied on the first programmable basic device 12, so as to implement spectroscopic control.

In some non-limiting embodiments of the present disclosure, the phase of the optical signal may be controlled by setting the first programmable basic device 12. That is, the phase of the optical signal input into the first programmable basic device 12 is set by controlling the electrical signal applied on the first programmable basic device 12, or the phase of the optical signal output from the first programmable basic device 12 is set by controlling the electrical signal applied on the first programmable basic device 12. When the optical signal is simultaneously input from a plurality of input interfaces into the first programmable basic device 12 or simultaneously output from a plurality of output interfaces, the interference of the optical signal passing through the first programmable basic device 12 may be controlled by controlling the phase of the optical signal.

Further, each two first programmable basic devices 12 on the optical chip are connected through the first transmission path 11, so that the optical signal from each output interface of the first programmable basic device 12 is transmitted into the first transmission path 11, and then transmitted to another first programmable basic device 12.

Therefore, in the embodiments of the present disclosure, the transmission path of the optical signal on the optical chip and the interference of the optical signal may be controlled by setting the first programmable basic devices 12. The first programmable basic device 12 may be an optical switch based on a Mach-Zehnder interferometer (MZI), or a micro-electro-mechanical system (MEMS) device, but is not limited thereto.

Further, in the embodiments of the present disclosure, the first programmable basic devices 12 on the optical chip are arranged in an array, and each two first programmable basic devices 12 are connected through the first transmission path 11. The first programmable basic devices 12 and the first transmission paths 11 on the optical chip may form an optical connection network, and the optical connection network may function as optical routing.

Further, a plurality of first programmable basic devices 12 may be arranged in an array of a first preset shape. For example, the first programmable basic devices 12 may be arranged in a hexagonal array, or a quadrangular array, or a pentagonal array, which is not limited herein. FIG. 1 shows that a plurality of first programmable basic devices 12 are arranged in a hexagonal array, that is, the first preset shape is hexagonal. On the same optical chip, shapes formed by the array arrangement of the first programmable basic devices 12 may be the same.

Further, a distance between each two first programmable basic devices 12 may be different. That is, the first transmission paths 11 may have different lengths. Therefore, the first preset shape formed by the array arrangement of the first programmable basic devices may have different sizes. It should be noted that, when the first programmable basic devices 12 are arranged in the array of the first preset shape, the plurality of first transmission paths 11 may also form a grid structure with the same shape.

In some non-limiting embodiments of the present disclosure, the first programmable basic devices 12 are arranged in a hexagonal array. In this case, the transmission path of the optical signal on the optical chip can be conveniently controlled by controlling the first programmable basic devices 12. That is, when the first programmable basic devices 12 are arranged in the hexagonal array, it is more flexible to control the transmission path of the optical signal.

Further, the optical IP core 13 may be optically coupled to the first programmable basic device 12 through the first transmission path 11.

Specifically, the optical signal output from the optical IP core 13 may be transmitted to the first transmission path 11, and transmitted into the first programmable basic device 12 through the first transmission path 11, so as to allow the first programmable basic device to perform spectroscopic control on the optical signal output from the optical IP core 13.

Further, the optical signal output from the first programmable basic device 12 may be transmitted into the optical IP core 13 through the first transmission path 11, so as to allow the optical IP core 13 to process the optical signal output from the first programmable basic device 12.

Further, the optical IP cores 13 are optically coupled through the first transmission paths 11. That is, the optical signal output from an optical IP core 13 may be transmitted to another optical IP core 13 through the first transmission paths 11, so as to allow another optical IP core to continue to process the optical signal.

Further, the optical IP core 13 may be located at a peripheral 102 of the plurality of first transmission paths 11, or embedded in an interior 103 of the plurality of first transmission paths 11.

It should be clear that, a position of the optical IP core 13 on the optical chip is not limited herein. In actual applications of the optical chip, the position of the optical IP core 13 may be adjusted according to needs.

In other words, the optical IP core 13 may be embedded in the optical connection network, and connected to the first transmission paths 11. The optical IP core 13 may also be located at a periphery of the optical connection network, and connected to the first transmission paths 11. That is, the optical IP core 13 being located at the periphery 102 of the first transmission paths 11 means that the optical IP core 13 is located at a periphery of a structure of the optical connection network formed by the plurality of first transmission paths 11 and the plurality of first programmable basic devices 12. The optical IP core 13 being embedded in the interior 103 of the first transmission paths 11 does not mean that the optical IP core 13 is located in an interior of a single first transmission path 11, but means that the optical IP core 13 is located in the structure of the optical connection network formed by the first transmission paths 11 and the plurality of first programmable basic devices 12.

Therefore, the optical chip may include the optical connection network and the optical IP cores 13. The optical connection network may include the first transmission paths 11 and the first programmable basic devices 12.

In some non-limiting embodiments of the present disclosure, the optical IP core 13 is embedded in the interior 103 of the plurality of first transmission paths 11. In this case, a distance between each two first programmable basic devices 12 (namely, the length of the first transmission path 11) may be determined according to the size of the optical IP core 13. In other words, a size of the first preset shape formed by the array arrangement of the first programmable basic devices 12 may be adapted to the size of the optical IP core 13 embedded in the interior 103 of the plurality of first transmission paths 11.

It should be noted that, compared with that the optical IP core 13 is located at the peripheral 102 of the first transmission paths 11, the optical IP core 13 being embedded in the interior 103 of the plurality of first transmission paths 11 can shorten the transmission path of the optical signal, thereby enhancing the transmission efficiency, and can also reduce an area of the optical chip, thereby improving the integration level of the optical chip. It should also be noted that, the most reasonable position may be selected according to characteristics of the optical IP core 13 itself and the function to be implemented.

Further, the optical IP cores 13 may include one or more types of optical soft cores.

Figure 2:
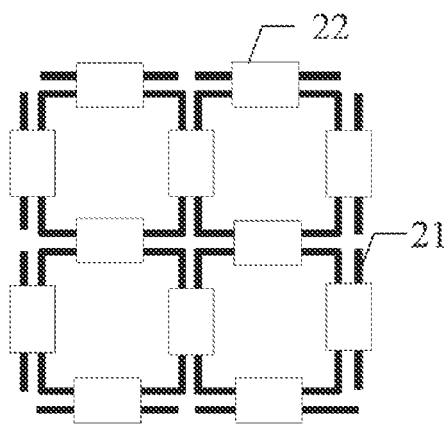
FIG. 2 is a schematic structural diagram of a first optical soft core according to some embodiments of the present disclosure.

Referring to FIG. 2, FIG. 2 is a schematic structural diagram of an optical soft core according to some embodiments of the present disclosure.

The optical soft core may include one or more second transmission paths 21 for transmitting the optical signal in the optical soft core, and second programmable basic devices 22. The second transmission path 21 may be an optical waveguide.

Specifically, the second programmable basic device 22 may be configured to control a path and/or a phase of the optical signal transmitted in the second transmission path 21.

Further, the second programmable basic device 22 may be further configured to control a transmission amount of the optical signal in the second transmission path 21.

Specifically, the second programmable basic device 22 has at least one input interface. The input interface is connected to a second transmission path 21, and the optical signal transmitted in the second transmission path 21 can be input into the second programmable basic device 22 through the input interface. The second programmable basic device further has a plurality of output interfaces, each of the output interfaces is connected to a second transmission path 21. For the optical signal input into the second programmable basic device 22, one or more output interfaces through which the optical signal is output from the second programmable basic device 22 may be set by controlling an electrical signal applied on the second programmable basic device 22, so as to implement spectroscopic control.

In some non-limiting embodiments of the present disclosure, the phase of the optical signal transmitted in the optical soft core may be controlled by setting the second programmable basic device 22. That is, the phase of the optical signal input into the second programmable basic device 22 is set by controlling the electrical signal applied on the second programmable basic device 22, or the phase of the optical signal output from the second programmable basic device 22 is set by controlling the electrical signal applied on the second programmable basic device 22. When the optical signal is simultaneously input from a plurality of input interfaces of the second programmable basic device 22 or simultaneously output from a plurality of output interfaces, the interference of the optical signal passing through the second programmable basic device 22 may be controlled by controlling the phase of the optical signal in the optical soft core.

Further, each two second programmable basic devices 22 in the optical soft core are connected through the second transmission path 21. The optical signal from each output interface of the second programmable basic device 22 can continue to be transmitted into the second transmission path 21, and then transmitted into another second programmable basic device 22.

Therefore, in the embodiments of the present disclosure, for the same optical soft core, the transmission path and/or the phase of the optical signal in the optical soft core may be controlled by setting the second programmable basic devices 22. If the transmission path or the phase of the optical signal in the optical soft core is different, the function and/or the performance of the optical soft core is different. That is, in the embodiments of the present disclosure, the transmission path and/or the phase of the optical signal in the optical soft core is changed by setting the second programmable basic devices 22, so as to change the function and/or the performance of the optical soft core. Therefore, the optical soft core in the embodiments of the present disclosure is programmable and reusable. The second programmable basic device 22 may be an optical switch including a Mach-Zehnder interferometer, or may be a micro-electro-mechanical system device, which is not limited herein.

Further, the second programmable basic devices 22 are arranged in an array of a second preset shape. The second preset shape may be set during a design process of the optical chip. It should be noted that, the second preset shape is a shape formed by the array arrangement of a plurality of second programmable basic devices 22, instead of a shape of the second programmable basic devices 22 themselves.

It should also be noted that, the shape formed by the array arrangement of the plurality of second programmable basic devices 22 may means, in a case that each preset quantity of second programmable basic devices 22 in the optical soft core are in the array arrangement, a polygonal shape formed by the preset quantity of second programmable basic devices 22. The preset quantity is less than or equal to a quantity of all the second programmable basic devices in the optical soft core. An example is a hexagon formed by an array arrangement of each six second programmable basic devices 22, or a triangle formed by an array arrangement of each three second programmable basic devices 22. Taking FIG. 2 as an example, in the optical soft core shown in FIG. 2, the second preset shape is a square formed by an array arrangement of every four second programmable basic devices 22, which is not limited therein.

In some non-limiting embodiments of the present disclosure, the first preset shape may be different from the second preset shape.

Further, when the optical chip includes a plurality of types of optical soft cores, different types of optical soft cores may have different functions and/or performances. It should be noted that, the function refers to a use type of an optical soft core. For example, the optical soft core may have a function of a delay line or a function of a filter, which is not limited therein. The performance refers to a specific performance of an optical soft core when implementing a certain function, for example, a specific delay time when the optical soft core performs the delay line function.

Further, in the embodiments of the present disclosure, the different types of optical soft cores may satisfy one or more of the following: the second preset shapes being different, types of the second programmable basic devices 22 being different, sizes of the second programmable basic devices being different, quantities of the second programmable basic devices being different, and overall shapes of the second programmable basic devices being different.

Specifically, when the second preset shape formed by the array arrangement of the second programmable basic devices 22 in an optical soft core is different, the type of the optical soft core is different. That is, for a different application requirement faced by the optical chip, the shape of the array arrangement of the second programmable basic devices 22 in the optical soft core may be different. For example, for an optical chip applied to microring structure, the second programmable basic devices 22 in the optical soft core may be arranged in a quadrangular array; and for an optical chip applied to optical computing, the second programmable basic devices 22 in the optical soft core may be arranged in a grid array.

Figure 3:
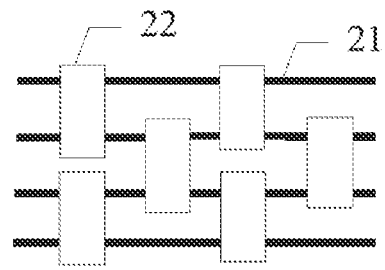
FIG. 3 is a schematic structural diagram of a second optical soft core according to some embodiments of the present disclosure.

Referring to FIG. 3, FIG. 3 is a schematic structural diagram of another optical soft core. The optical soft core shown in FIG. 3 may be configured for optical computing. The second programmable basic devices 22 are arranged in a grid array. When performing the optical computing, the optical soft core shown in FIG. 3 can effectively implement matrix calculation, which improves the calculation speed and has better universality. It should be noted that a plurality of second transmission paths 21 may cross.

Still referring to FIG. 2, if the types of the second programmable basic devices 22 are different, the types of the optical soft cores are also different. For example, if the type of the second programmable basic devices 22 in an optical soft core A is an optical switch based on a Mach-Zehnder interferometer, and the type of the second programmable basic devices 22 in an optical soft core B is an optical switch based on a micro-electro-mechanical system device, the optical soft core A and the optical soft core B belong to different types of optical soft cores.

Further, when the sizes of the second programmable basic devices 22 are different, the types of the optical soft cores are also different. More specifically, when the lengths of the second programmable devices 22 in optical soft cores are different, the types of the optical soft cores are also different. It should be noted that, the sizes of the second programmable basic devices 22 being different does not mean that the same optical soft core includes second programmable basic devices 22 with different sizes, but means that the size of the second programmable basic devices 22 in an optical soft core X is different from the size of the second programmable basic devices 22 in an optical soft core Y.

Further, when the quantities of the second programmable basic devices 22 included in optical soft cores are different, the types of the optical soft cores are also different.

Further, when the overall shapes of the second programmable basic devices 22 in optical soft cores are different, the types of the optical soft cores are also different. It should be noted that, the overall shape of the second programmable basic devices 22 is an overall shape formed by arranging all the second programmable basic devices 22 in an optical soft core.

Figure 4:
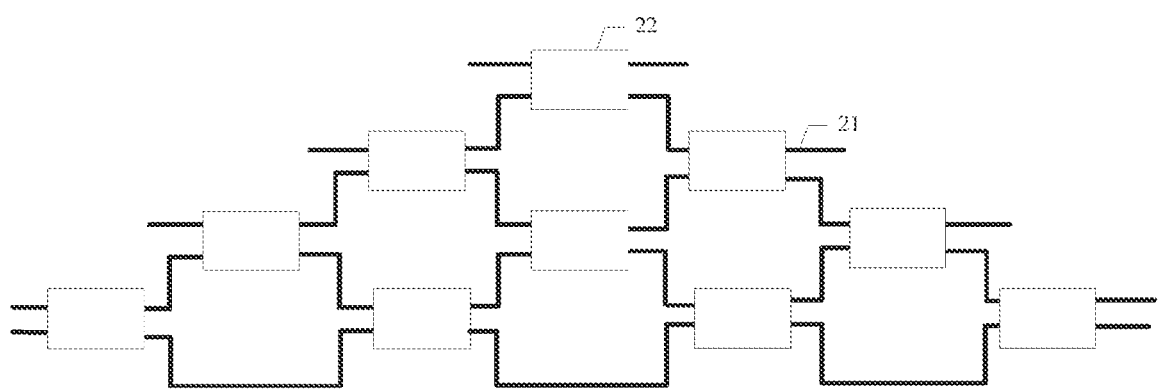
FIG. 4 is a schematic structural diagram of a third optical soft core according to some embodiments of the present disclosure

Referring to FIG. 4, FIG. 4 is a schematic structural diagram of a third optical soft core according to some embodiments of the present disclosure. The optical soft core shown in FIG. 4 may also be used for optical computing. The overall shape of the second programmable basic devices 22 in the optical soft core shown in FIG. 4 is triangle.

Therefore, in the embodiments of the present disclosure, differences in the types of the optical soft cores are intuitively indicated by using one or more of differences in the second preset shapes (e.g., a shape difference between quadrangle and hexagon) formed by the array arrangements of the second programmable basic devices 22, type differences, size differences, quantity differences, and overall shape differences of the second programmable basic devices 22.

From the above, as the optical chip is required to implement more complex functions, the same type of optical soft core is difficult to satisfy requirements of different functions. Even if the same type of optical soft core can be used to implement various different functions, it is generally necessary to increase the number of optical soft cores on the optical chip to satisfy the complex functional requirements. Since this results in an increasing number of devices on the optical chip, the power consumption of the optical chip is greatly increased, and control difficulty is relatively high in actual use. Therefore, in the embodiments of the present disclosure, the optical chip can have a plurality of different types of optical soft cores by the shape differences in the array arrangements of the second programmable basic devices 22, and/or the type differences, the size differences, the quantity differences, and the overall shape differences of the second programmable basic devices 22. The optical chip can implement richer and more complex functions with the different types of optical soft cores. This can reduce the number of devices on the optical chip, thereby reducing the power consumption and the control difficulty, compared with using a single type of optical soft core to achieve complex functions.

Further, the optical soft core may be located at the periphery of the plurality of first transmission paths, or embedded in the interior of the plurality of first transmission paths. For specific content about the position of the optical soft core on the optical chip, reference may be made to the above description about the position of the optical IP core on the optical chip, which is not detailed herein.

Further, the optical IP cores may further include one or more types of optical firm cores.

Figure 5:
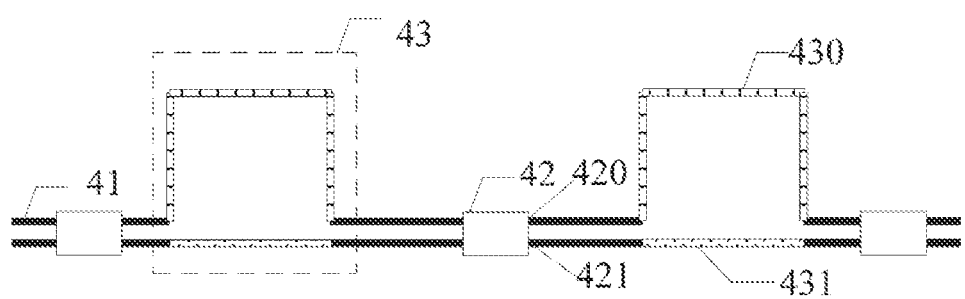
FIG. 5 is a schematic structural diagram of an optical firm core according to some embodiments of the present disclosure.

Referring to FIG. 5, FIG. 5 is a schematic structural diagram of an optical firm core according to some embodiments of the present disclosure.

The optical firm core includes one or more third transmission paths 41 for transmitting the optical signal in the optical firm core, third programmable basic devices 42, and first optical devices 43 used to process the optical signal. It should be clear that, the first optical device 43 in the optical firm core determines the function of the optical firm core, and the third programmable device 42 in the optical firm core may be used to adjust a performance of the first optical device 43 in the optical firm core, so as to make it satisfy requirements for different performances of the same first optical device. In other words, the function of the optical firm core is fixed, but the specific performance of the optical firm core under this function can be changed by performing operations, such as programming, on the third programmable basic device 42.

Specifically, the third transmission path 41 may be an optical waveguide. The first optical device 43 and the third programmable basic device 42 are optically coupled through the third transmission path 41.

Further, the third programmable basic device 42 is configured to control a path and/or a phase of the optical signal transmitted in the third transmission path 41.

Further, the third programmable basic device 42 may be further used to control a transmission amount of the optical signal in the third transmission path 41.

Specifically, the third programmable basic device 43 has at least one input interface. The input interface is connected to a third transmission path 41, and the optical signal transmitted in the third transmission path 41 may be input into the third programmable basic device 42 through the input interface. The third programmable basic device 42 further has a plurality of output interfaces, each of which is connected to a third transmission path 41. For the optical signal input into the third programmable basic device 42, one or more output interfaces through which the optical signal is output from the third programmable basic device 42 may be set by controlling an electrical signal applied on the third programmable basic device 42, so as to implement spectroscopic control.

In some non-limiting embodiments of the present disclosure, the phase of the optical signal transmitted in the optical firm core may also be controlled by setting the third programmable basic device 42, that is, the phase input into the third programmable basic device 42 may be set by controlling the electrical signal applied on the third programmable basic device 42, or the phase of the optical signal output from the third programmable basic device 42 may be set by controlling the electrical signal applied on the third programmable basic device 42. When the optical signal is simultaneously input from the plurality of input interfaces or simultaneously output from the plurality of output interfaces of the third programmable basic device 42, the interference of the optical signal passing through the third programmable basic device 42 may be controlled by controlling the phase of the optical signal.

Further, the optical firm core may further include the first optical devices 43. The first optical device 43 may be an optical component that processes the optical signal. The optical component may be a part of an optical device such as a delay line, a filter, a modulator and a wavelength division multiplexer, this part being configured to process the optical signal for implementing the function of the optical device, which is not limited herein. It should be noted that, different from the complete optical device that can independently implement a specific function, such as a delay line, a filter, a modulator, a wavelength division multiplexer, etc., the first optical device 43 in the embodiments of the present disclosure needs to be connected to the third programmable basic device 42 and the third transmission path 41, so as to implement the function of the optical firm core.

Further, the optical signal of each output interface of the third programmable basic device 42 may continue to be transmitted to the third transmission path 41, and then continue to be transmitted to the first optical device 43 through the third transmission path 41. The third programmable basic device 42 may be an optical switch including a Mach-Zehnder interferometer, or may be a micro-electro-mechanical system device, which is not limited herein.

For example, the first optical device 43 in the optical firm core shown in FIG. 5 is a delay line. The optical firm core is used to delay the optical signal for a period of time, that is, the function of the optical firm core is to delay the optical signal. In this case, the setting may be performed by performing operations, such as programming, on the third programmable device 42, to change the transmission path of the optical signal in the first optical device 43, thereby controlling a specific time length that the optical signal is delayed.

Specifically, the first optical device 43 includes a first path 430 and a second path 431. An optical distance of the first path 430 is $\Delta L$, an optical distance of the second path 431 is $\Delta L2$, and $\Delta L1$ is not equal to $\Delta L2$. The output interface 420 of the third programmable basic device 42 is connected to the first path through a third transmission path 41, the output interface 421 is connected to the second path through a third transmission path 41. The output interface of the optical signal output from the third programmable basic device 42 is selected by controlling the electrical signal applied on the third programmable basic device 42, so as to select the optical path of the optical signal in the first optical device 43. Various possible delay situations of the optical signal can be implemented by setting the first optical device 43 and the plurality of third programmable basic devices 43.

For another example, the first optical device 43 in the optical firm core is a microring filter, and the optical firm core is used to perform wavelength selection on the optical signal. That is, the function of the optical firm core is a filter. In this case, a state of the third programmable device 42 may be set by performing operations, such as programming, to change the transmission path of the optical signal in the optical firm core, thereby controlling a free spectral range of the microring filter.

Therefore, the optical firm core in the embodiments of the present disclosure includes the third transmission paths 41, the third programmable basic devices 42, and the first optical 20 devices 43. The function of the optical firm core is determined by the first optical devices 43, that is, the function of the optical firm core is fixed and cannot be changed by programming the third programmable basic devices 42. The specific performance under a specific function of the optical firm core is programmable. The transmission path and/or the phase of the optical signal in the optical firm core can be controlled by setting the third programmable basic devices 42. When the transmission path or the phase of the optical signal in the optical firm core is different, the performance of the optical firm core is different. That is, in the embodiments of the present disclosure, the transmission path and/or the phase of the optical signal in the optical firm core is changed by setting the third programmable basic devices 42, so as to change the performance of the optical firm core.

Further, the optical firm core may be located at the periphery of the first transmission paths, or embedded in the interior of the plurality of first transmission paths. For the position of the optical firm core on the optical chip, reference may be made to the above description about the position of the optical IP core on the optical chip, which is not detailed herein.

Figure 6:
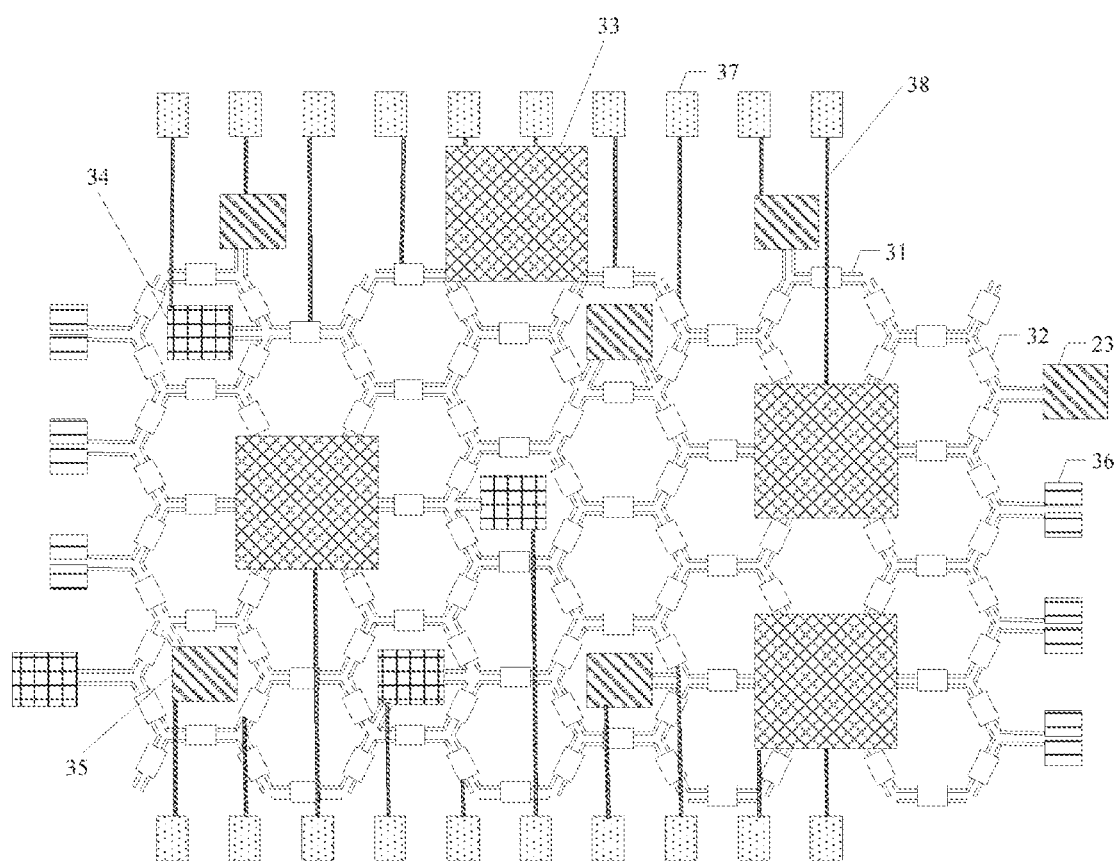
FIG. 6 is a schematic structural diagram of another programmable optical chip according to some embodiments of the present disclosure.

Referring to FIG. 6, FIG. 6 is a schematic structural diagram of another programmable optical chip according to some embodiments of the present disclosure.

The optical chip shown in FIG. 6 may include one or more first transmission paths 31 for transmitting an optical signal, first programmable basic devices 32, optical soft cores 33, and optical firm cores 35. For specific content of the one or more first transmission paths 31 for transmitting the optical signal, the first programmable basic devices 32, the optical soft cores 33, and the optical firm cores 35, reference may be made to the above description, which is not detailed herein.

Further, the optical IP cores on the optical chip may further include one or more types of optical hard cores 34. The optical hard cores 34 is second optical devices used to process the optical signal. For example, the optical hard cores may include one or more of the following: a power amplifier, a laser, a detector, a modulator, an optical intensity monitor, an attenuator, a wavelength division multiplexer, which is not limited herein. It should be clear that, different from the first optical device, the second optical device is a complete optical device that can independently implement a specific function.

In some non-limiting embodiments of the present disclosure, the optical hard cores 34 may further include: a high-performance filter, a high-performance delay line, etc.

It should be clear that the optical hard core 34 does not include a programmable basic device. The function and the performance of the optical hard core 34 cannot be changed by performing operations, such as programming. That is, the optical hard core is opposite to the concept of programmable, and has the characteristic that the function and the performance cannot be changed by performing operations such as programming after being manufactured. In other words, in the solution of the embodiments of the present disclosure, the transmission path and/or the phase of the optical signal in the optical hard core 34 cannot be changed by setting a programmable basic device, and accordingly the function or the performance of the optical hard core 34 cannot be changed by setting the programmable basic device.

Therefore, the optical hard core 34 has good universality, and can be used to implement some universal functions and/or standard performances of the optical chip, with no need to program the optical soft core 33 for implementing those universal functions and/or standard performances, which can reduce the area of the optical chip, and improving the integration level of the optical chip.

Further, the optical hard core 34 may be located at the periphery of the plurality of first transmission paths 31, or embedded in the interior of the plurality of first transmission paths 31. For specific content about the position of the optical hard core 34 on the optical chip, reference may be made to the above description about the position of the optical IP core in the optical chip, which is not detailed herein.

Further, the optical chip may further include optical interfaces 36. The optical interface 36 may be configured to input or output an optical signal. The optical interface 36 may be an interface based on grating coupling, or an interface based on edge coupling. The optical interfaces may be located around the optical connection network.

Further, the optical interface 36 may be connected to the optical IP core through the first transmission paths 31, so as to allow an externally input optical signal to be transmitted into the optical IP core. Alternatively, the optical interface 36 may be connected to the first programmable basic device 32 through the first transmission paths 31, so as to allow an externally input optical signal to be first transmitted into the first programmable basic device 32, and then transmitted into the optical IP core. The optical signal output from the optical IP core may be transmitted to the optical interface 36 through the first transmission paths 31 and/or the first programmable basic device 32, so as to be further transmitted outside of the optical chip.

Further, the optical chip may further include electrical interfaces 37. The electrical interface 37 is configured to input or output an electrical signal. The electrical signal may be an electrical control signal for controlling the first programmable basic device 32, the second programmable basic device, or the third programmable basic device. The electrical signal may also be an electrical control signal for controlling the optical hard core 34 (e.g., a modulator, a power amplifier). The electrical control signal may turn on or off the optical hard core 34 or set an operating parameter of the optical hard core 34, for example, an amplification factor of a power amplifier, etc., which is not limited herein.

The electrical signal may also be an electrical control signal for controlling the first optical device in the optical firm core 35, and the electrical control signal may be used for setting an operating parameter of the first optical device.

It should be noted that, the setting of the operating parameter of the optical hard core 34 or the first optical device in the optical firm core 35 by the electrical signal described above is different from the "programmable" in the embodiments of the present disclosure. It can be understood that, "programmable" in the embodiments of the present disclosure refers to controlling the electrical control signal applied on each first programmable basic device 32 to control the first programmable basic device 32, so as to change the transmission path and/or the phase of the optical signal in the optical connection network; and/or controlling the electrical control signal applied on each second programmable basic device to control the second programmable basic device, so as to change the transmission path and/or the phase of the optical signal in the optical soft core 33; and/or controlling the electrical control signal applied on each third programmable basic device to control the third programmable basic device, so as to change the transmission path and/or the phase of the optical signal in the optical firm core 35. However, the setting of the operating parameter only refers to selection based on one or more parameter options provided by an existing device, without using a programmable basic device.

The electrical signal may also be an electrical signal generated by the optical hard core 34 and is used for carrying optical signal information. For example, the electrical signal may be optical intensity information measured by a photodetector. The electrical interface 37 may be a direct current signal interface, or an alternating current signal interface, for example, a radio frequency signal interface.

Specifically, the electrical signal may be further used for controlling the first programmable basic device 32 to perform optical switching on the optical signal in the first transmission paths 31. That is, the transmission path and/or the phase of the optical signal on the optical chip is changed by changing the electrical signal applied on the first programmable basic device 31.

Specifically, the electrical signal may be further used for controlling the second programmable basic device to perform optical switching on the optical signal in the second transmission paths. That is, the transmission path and/or the phase of the optical signal in the optical soft core 33 can be changed by changing the electrical signal applied on the second programmable basic device, so as to implement the programming operation on the second programmable basic device in the optical soft core 33, thereby changing the function and/or the performance of the optical soft core 33.

Further, the electrical signal may be further used for controlling the third programmable basic device to perform optical switching on the optical signal in the third transmission paths. That is, the transmission path and/or the phase of the optical signal in the optical firm core 35 is changed by changing the electrical signal applied on the third programmable basic device, so as to implement the programming operation on the third programmable basic device in the optical firm core 35, thereby changing the performance of the optical firm core 35.

Further, the optical chip may further include electrical connection lines 38. The electrical connection line 38 is configured to transmit the above-mentioned electrical signal. An end of the electrical connection line 38 is connected to the electrical interface 37, and the other end of the electrical connection line 38 may be connected to any one of the optical soft core 33, the optical firm core 35, the optical hard core 34, and the first programmable basic device 32.

From the above, the embodiments of the present disclosure provide the optical chip, including the optical IP cores. The optical IP cores may be the optical soft cores, the optical firm cores, or the optical hard cores. The function and the performance of the optical soft core can be implemented by programming the second programmable basic devices, so the optical soft core is the most flexible, and can be used to implement a function of a device which is used less frequently. The function and the performance of optical hard core are both fixed, so the optical hard core has universality, high frequency of use, easy operation and high reliability. The function of the optical firm core is fixed, but different performances can be achieved by programming the third programmable basic devices, so the optical firm core has the flexibility between those of the optical hard core and the optical soft core. The optical chip may be applied to the fields such as optical communication, photonic artificial intelligence, microwave photonics, optical quantum computing, optical sensing, etc., which is not limited herein.

Therefore, the embodiments of the disclosure define the architecture of the programmable optical chip in detail, which lays a foundation for the programmable optical chip developing towards large-scale and multi-function. The programmable optical chip provided by the embodiments of the present disclosure has higher device efficiency and can implement richer and more complex functions; and in addition, solves the problem that different functional devices have different design requirements for the optical chip.

Some embodiments of the present disclosure further provides a terminal, which may include a programmable optical chip as described above. The terminal may be any form of terminal, an access terminal, a user unit, a user station, a user terminal, a terminal device, a vehicle-mounted device, an Internet of Things device, etc. The terminal may be applied to fields such as optical communication, photonic artificial intelligence, microwave photonics, optical quantum computing, optical sensing, etc., which is not limited herein.

It should be understood that, the term "and/or" in the present disclosure simply represents an association relationship that describes associated objects, and represents that three relationships may exist. For example, A and/or B may represent the following three cases: only A exists, both A and B exist, and only B exists. In addition, the character "/" herein generally indicates an "or" relationship between the associated objects.

In the embodiments of the present disclosure, "a plurality of" means two or more. The description such as first, second, etc. in the embodiments of the present disclosure are merely used for illustration and distinguishing description objects. They do not represent an order, nor do they represent any particular limitation on the number of devices herein, thus cannot constitute any limitations on the embodiments of the present disclosure.

The present disclosure is disclosed as above, but is not limited thereto. Any person skilled in the art can make various changes and modifications without departing from the spirit and scope of the present disclosure. Therefore, the protection scope of the present disclosure should be based on the scope defined by the claims.

What is claimed is:

1. A programmable optical chip comprising:
   one or more first transmission paths for transmission of optical signals in the optical chip;
   first programmable basic devices arranged in an array of a first preset shape; and
   optical IP cores, wherein the optical IP cores and the first programmable basic devices are optically coupled through the first transmission paths, the first programmable basic devices are optically coupled through the first transmission paths, and the optical IP cores are optically coupled through the first transmission paths;
   wherein the optical IP cores comprise one or more types of optical soft cores, one or more types of optical firm cores, and one or more types of optical hard cores, wherein each type of the optical soft cores comprises second programmable basic devices and one or more second transmission paths for transmission of the optical signals in the optical soft core, and each type of the optical firm cores comprises third programmable basic devices, one or more third transmission paths for transmission of the optical signals in the optical firm core, and first optical devices for processing the optical signals,
   wherein a function of the optical soft core is changed by setting the second programmable basic devices, a function of the optical firm core is fixed based on the first optical devices to a programmable delay line, a programmable filter, a programmable modulator, or a programmable wavelength division multiplexer, performances of the first optical devices in the optical firm core are adjusted by the third programmable basic devices, and a function and a performance of the optical hard core are fixed; and
   wherein the first programmable basic devices are configured to control one or more paths and one or more phases of the optical signals transmitted in the first transmission paths, the second programmable basic devices are configured to control one or more paths and one or more phases of optical signals transmitted in the second transmission paths, and the third programmable basic devices are configured to control one or more paths and one or more phases of optical signals transmitted in the third transmission paths.

2. The programmable optical chip according to claim 1, wherein:
   the second programmable basic devices are arranged in an array of a second preset shape, and
   different types of the optical soft cores satisfy one or more of the second preset shapes being different, types of the second programmable basic devices being different, sizes of the second programmable basic devices being different, quantities of the second programmable basic devices being different, or overall shapes of the second programmable basic devices being different.

3. The programmable optical chip according to claim 1, wherein the optical hard cores are second optical devices to process the optical signals.

4. The programmable optical chip according to claim 3, wherein the optical hard cores comprise one or more of a power amplifier, a laser, a detector, a modulator, an optical intensity monitor, an attenuator, a filter, a delay line, or a wavelength division multiplexer.

5. The programmable optical chip according to claim 1, wherein the optical firm cores comprise one or more of a programmable delay line, a programmable filter, a programmable modulator, or a programmable wavelength division multiplexer.

6. The programmable optical chip according to claim 1, wherein the optical chip satisfies one or more of
   the first programmable basic devices being optical switches based on a Mach-Zehnder interferometer or a micro-electro-mechanical system device;

the second programmable basic devices being optical switches based on a Mach-Zehnder interferometer or a micro-electro-mechanical system device; or the third programmable basic devices being optical switches based on a Mach-Zehnder interferometer or a micro-electro-mechanical system device.

7. The programmable optical chip according to claim 1, wherein the optical IP cores are located at a periphery of a plurality of first transmission paths or embedded in an interior of the plurality of first transmission paths.

8. The programmable optical chip according to claim 1, wherein the optical chip further comprises optical interfaces configured to input or output the optical signals, and the optical interfaces comprises interfaces based on grating coupling and interfaces based on edge coupling.

9. The programmable optical chip according to claim 1, wherein the optical chip further comprises: one or more electrical interfaces configured to input or output electrical signals.

10. The programmable optical chip according to claim 1, wherein the first programmable basic devices are arranged in a hexagonal array.

11. The programmable optical chip according to claim 1, wherein, upon optical computing by the optical chip, a plurality of the second programmable basic devices in each of the optical soft cores are arranged in a grid array or a triangular array.

12. The programmable optical chip according to claim 1, wherein the first transmission paths, the second transmission paths, and the third transmission paths are optical waveguides.

13. A terminal, comprising a programmable optical chip, wherein the optical chip comprises:
one or more first transmission paths for transmission of optical signals in the optical chip;
first programmable basic devices arranged in an array of a first preset shape; and
optical IP cores, wherein the optical IP cores and the first programmable basic devices are optically coupled through the first transmission paths, the first programmable basic devices are optically coupled through the first transmission paths, and the optical IP cores are optically coupled through the first transmission paths;
wherein the optical IP cores comprise one or more types of optical soft cores, one or more types of optical firm cores, and one or more types of optical hard cores, wherein each type of the optical soft cores comprises second programmable basic devices and one or more second transmission paths for transmission of the optical signals in the optical soft core, and each type of the optical firm cores comprises third programmable basic devices, one or more third transmission paths for transmission of the optical signals in the optical firm core, and first optical devices for processing the optical signals, wherein a function of the optical soft core is changed by setting the second programmable basic devices, a function of the optical firm core is fixed based on the first optical devices to a programmable delay line, a programmable filter, a programmable modulator, or a programmable wavelength division multiplexer, performances of the first optical devices in the optical firm core are adjusted by the third programmable basic devices, and a function and a performance of the optical hard core are fixed; and
wherein the first programmable basic devices are configured to control one or more paths and one or more phases of the optical signals transmitted in the first transmission paths, the second programmable basic devices are configured to control one or more paths and one or more phases of optical signals transmitted in the second transmission paths, and the third programmable basic devices are configured to control one or more paths and one or more phases of optical signals transmitted in the third transmission paths.

14. The terminal according to claim 13, wherein:
the second programmable basic devices are arranged in an array of a second preset shape, and
different types of the optical soft cores satisfy one or more of the second preset shapes being different, types of the second programmable basic devices being different, sizes of the second programmable basic devices being different, quantities of the second programmable basic devices being different, or overall shapes of the second programmable basic devices being different.

15. The terminal according to claim 13, wherein the optical hard cores are second optical devices to process the optical signals.

16. The terminal according to claim 15, wherein the optical hard cores comprise one or more of a power amplifier, a laser, a detector, a modulator, an optical intensity monitor, an attenuator, a filter, a delay line, or a wavelength division multiplexer.

17. The terminal according to claim 13, wherein the optical firm cores comprise one or more of a programmable delay line, a programmable filter, a programmable modulator, or a programmable wavelength division multiplexer.

18. The terminal according to claim 13, wherein the optical chip satisfies one or more of
the first programmable basic devices being optical switches based on a Mach-Zehnder interferometer or a micro-electro-mechanical system device;
the second programmable basic devices being optical switches based on a Mach-Zehnder interferometer or a micro-electro-mechanical system device; or
the third programmable basic devices being optical switches based on a Mach-Zehnder interferometer or a micro-electro-mechanical system device.

19. The terminal according to claim 13, wherein the optical IP cores are located at a periphery of a plurality of first transmission paths or embedded in an interior of the plurality of first transmission paths.

20. The terminal according to claim 13, wherein the optical chip further comprises optical interfaces configured to input or output the optical signals, and the optical interfaces comprises interfaces based on grating coupling and interfaces based on edge coupling.

* * * * *